(12) United States Patent
Nakazato (10) Patent No.: US 7,308,736 B2
(45) Date of Patent: Dec. 18, 2007

(54) APPARATUS OF ATTACHING INTERIOR PART OF AUTOMOBILE

(75) Inventor: Hiroshi Nakazato, Kanagawa (JP)

(73) Assignee: Piolax, Inc., Yokohama-Shi, Kanagawa (JP)

( * ) Notice: Subject to any disclaimer, the term of this patent is extended or adjusted under 35 U.S.C. 154(b) by 197 days.

(21) Appl. No.: 11/284,033

(22) Filed: Nov. 22, 2005

(65) Prior Publication Data
US 2006/0174584 A1 Aug. 10, 2006

(30) Foreign Application Priority Data
Nov. 25, 2004 (JP) ............... P2004-341100

(51) Int. Cl.
*B60N 3/02* (2006.01)
*F16B 5/06* (2006.01)

(52) U.S. Cl. ............... 24/289; 24/573.09; 24/581.11; 296/1.02

(58) Field of Classification Search ............ 24/289, 24/573.09, 581.11; 296/1.02, 71, 214; 297/411.21; 16/110.1, DIG. 24
See application file for complete search history.

(56) References Cited

U.S. PATENT DOCUMENTS

| | | | | |
|---|---|---|---|---|
| 4,981,322 A | * | 1/1991 | Dowd et al. | 296/214 |
| 5,507,545 A | * | 4/1996 | Krysiak | 296/97.9 |
| 5,662,375 A | * | 9/1997 | Adams et al. | 296/214 |
| 6,428,089 B1 | * | 8/2002 | Noda | 296/214 |
| 6,467,130 B2 | * | 10/2002 | Kurachi et al. | 16/438 |
| 2003/0234549 A1 | * | 12/2003 | Totani et al. | 296/1.02 |

FOREIGN PATENT DOCUMENTS

JP 2003-226182 8/2003

* cited by examiner

*Primary Examiner*—Robert J. Sandy
(74) *Attorney, Agent, or Firm*—McGinn IP Law Group, PLLC (57) ABSTRACT

An attaching Apparatus of an interior part of an automobile includes a base portion, a clip and a cap. The base portion includes an opening portion and a projected portion, the clip includes a front end portion, a parallel portion, a base end portion, a draw stop claw, a hold claw and an engaging hole and is set such that when the parallel portions are maximally closed, an interval between front ends of the draw stop claws<an inner diameter of a vehicle body panel attaching hole<an interval between front ends of the hold claws. Therefore, when the draw stop claws are drawn out from an attaching hole, the hold claws do not pass the attaching hole, and the clip is prevented from being dropped to a back face side of a vehicle body panel.

5 Claims, 10 Drawing Sheets

APPARATUS OF ATTACHING INTERIOR PART OF AUTOMOBILE

BACKGROUND OF THE INVENTION

1. Field of the Invention

The present invention relates to an attaching apparatus preferable for attaching, for example, an interior part of an assist grip or the like of an automobile to a vehicle body panel.

2. Description of the Related Art

An interior part of an assist grip, a sun visor or the like of an automobile is attached by an attaching apparatus including a base portion connected to the interior part, a clip a base end portion of which is held by the base portion and a front end portion of which is inserted to be locked by a vehicle body panel attaching hole, and a cap having a leg portion inserted into an inner side of the clip for ensuring a state of locking the clip.

JP-A-2003-226182, shown below, discloses an apparatus of attaching an interior part of an automobile in which a clip inserting hole is provided at a base portion connected to an assist grip, a base end portion of a clip is engaged with an inner periphery of the inserting hole, a front end portion of the clip is projected from the base portion to be inserted into an attaching hole of a vehicle body panel, a first latching claw provided at the clip is engaged with a peripheral edge on a back face side of the attaching hole, a second latching claw provided at the clip is engaged with a peripheral edge on a surface side of the attaching hole, thereby, the clip is attached by the vehicle body panel, a cap is covered on the base portion and a press plug formed at an inner face thereof is inserted into an inner side of the clip, and a latched state is maintained by preventing contraction of a diameter of the clip.

SUMMARY OF THE INVENTION

According to the above-described attaching apparatus of the background art, when the clip needs to be detached from the vehicle body panel, the cap is detached from the base portion, the diameter of the clip is contracted by pinching the base end portion of the clip, and the first latching claw is drawn out from the attaching hole.

However, when the diameter of the clip is contracted by pinching the base end portion of the clip, there is a case in which the base portion side of the clip is drawn from the inserting hole of the base portion, the second latching claw passes the attaching hole of the vehicle body panel, and the clip is dropped to a space on a back face side of the vehicle body panel. Further, when the clip is dropped to the space on the back face side of the vehicle body panel, there poses a problem that the clip needs to be recovered by peeling off an interior panel and large-scaled operation is needed.

Therefore, it is an object of the invention to provide an apparatus of attaching an interior part of an automobile capable of firmly preventing a clip from being dropped to a back face side of a vehicle body panel when the clip is detached from the vehicle body panel.

In order to achieve the above-described object, according to a first aspect of the invention, there is provided an apparatus of attaching an interior part of an automobile including a base portion connected to an interior part of an automobile, a clip a base end portion of which is held by the base portion and a front end portion of which is inserted to be locked by a vehicle body panel attaching hole and a cap having a leg portion inserted to an inner side of the clip for ensuring a state of locking the clip; wherein the base portion includes an opening portion inserted with the base end portion of the clip and projected portions formed at inner walls of the opening portion opposed to each other; wherein the clip includes a front end portion bent in a U-like shape, parallel portions extended from the front end portion substantially in parallel with each other, a base end portion inserted into the opening portion of the base portion, a draw stop claw provided at the parallel portion and engaged with a peripheral edge on a back face side of the vehicle body panel attaching hole, a hold claw provided on a base end portion side of the draw stop claw and engaged with a peripheral edge on a surface side of the vehicle body panel attaching hole, and an engaging hole engaged with the projected portion of the base portion; and wherein in a state of maximally closing the parallel portions of the clip, the clip is set to constitute an interval between front ends of the draw stop claws<an inner diameter of the vehicle body panel attaching hole.

According to the above-described invention, the clip can be held by the base portion by inserting the base end portion of the clip to the opening portion of the base portion from the back face side, and fitting the projected portion of the base portion to the engaging hole provided at the base end portion of the clip. Under the state, when the front end portion of the clip is inserted into the attaching hole of the vehicle body panel, the draw stop claw is brought into contact with an inner periphery of the attaching hole and passes the attaching hole while elastically bending the clip and engaged with the peripheral edge on the back face side of the attaching hole. Further, the hold claw is engaged with the peripheral edge on the surface side of the attaching hole, the peripheral edges of the attaching hole of the vehicle body panel are pinched by the draw stop claw and the hold claw, and the clip is fixed to the vehicle body panel firmly without play. Further, when the leg portion of the cap is inserted into the inner side of the clip from the surface side of the base portion, the clip cannot be bent to the inner side, the fixed state can firmly be maintained.

Further, when the clip needs to be detached, by detaching the cap by drawing the leg portion of the cap from the inner side of the clip, contracting a diameter of the clip by pinching the base end portion of the clip by the finger or a plier, the interval between the front end portions of the draw stop claws of the clip becomes smaller than the inner diameter of the attaching hole and therefore, the clip can be drawn out from the attaching hole. At this occasion, even when the diameter of the clip is contracted as described above, the interval between the front end portions of the hold claw is larger than the inner diameter of the attaching hole and therefore, the hold claw does not pass through the attaching hole, the clip can firmly be prevented from being dropped to the back face side of the vehicle body panel. Therefore, the operation of detaching the clip can be carried out easily while feeling at ease.

According to a second aspect of the invention, in the first aspect of the invention, there is provided the apparatus of attaching an interior part of an automobile, wherein the clip is formed such that a width of the draw stop claw is wider than a width of the hold claw, a center of a front end thereof is provided with a notch in a V-like shape, the width of the hold claw is narrower than the width of the draw stop claw, in a state of developing a plate member constituting the clip, a front end of the hold claw is brought into the notch in the V-like shape of the draw stop claw.

According to the above-described invention, when the hold claw is opened to an outer side to expand, the interval between the front end portions can be increased by expanding the hold claw to the outer side by a larger amount and therefore, it is facilitated to make the interval between the front end portions of the hold claw larger than the inner diameter of the attaching hole.

According to a third aspect of the invention, in the first or the second aspect of the invention, there is provided the apparatus of attaching an interior part of an automobile, wherein the cap includes a head portion puts on the base portion, and a leg portion comprising a pair of plate-like portions extended from a back face of the head portion substantially in parallel with each other, both sides of the plate-like portions are brought into contact with inner sides of the parallel portions of the clip, and inner faces of the plate-like portions are formed with engaging claws engaged with the projected portions of the base portion.

According to the above-described invention, when the leg portion of the cap is inserted into the inner side, the engaging claw of the leg portion is engaged with the projected portion of the base portion inserted into the engaging hole of the clip, the leg portion is stopped from being drawn and therefore, it is not necessary to separately provide a structure of engaging the base portion and the cap, and the base portion and the cap can be facilitated to be formed by simplifying shapes thereof.

According to a fourth aspect of the invention, in the third aspect of the invention, there is provided the apparatus of attaching an interior part of an automobile, wherein front ends of the pair of plate-like portions constituting the leg portion of the cap are connected to each other.

According to the invention, there can firmly be prevented a trouble that the pair of plate-like portions constituting the leg portion of the cap are unpreparedly opened to the outer side to be caught by the peripheral edge on the surface side of the attaching hole of the vehicle body panel and the clip cannot be inserted.

According to a fifth aspect of the invention, in the third aspect of the invention, there is provided the apparatus of attaching an interior part of an automobile, wherein front ends of the pair of plate-like portions constituting the leg portion of the cap are separated from each other.

According to the invention, the pair of plate-like portions constituting the leg portion of the cap becomes easy to be opened to the outer side and therefore, although a possibility of bringing about the above-described trouble is more or less increased, the projected portion of the base portion is facilitated to be ridden over and therefore, the engaging claw of the leg portion can be facilitated to be engaged with the projected portion of the base portion.

According to the invention, when the clip needs to be detached, the cap is detached by drawing the leg portion of the cap from the inner side of the clip, the clip is contracted by pinching the base end portion of the clip by the finger or a plier, and the draw stop claw of the clip is drawn out from the attaching hole, the interval between the front end portions of the hold claw is larger than the inner diameter of the attaching hole and therefore, the hold claw does not pass through the attaching hole, and the clip can firmly be prevented from being dropped to the back face side of the attaching panel. Therefore, the operation of detaching the clip is carried out easily while feeling at ease.

BRIEF DESCRIPTION OF THE DRAWINGS

These and other objects and advantages of this invention will become more fully apparent from the following detailed description taken with the accompanying drawings in which:

FIGS. 2A and 2B show a base portion of the apparatus of attaching an interior part of an automobile.

FIGS. 3A and 3B show a clip of the apparatus of attaching an interior part of an automobile.

FIGS. 5A and 5B show a cap of the apparatus of attaching an interior part of an automobile.

DETAILED DESCRIPTION OF THE PREFERRED EMBODIMENTS

Next, an embodiment of an apparatus of attaching an interior part of an automobile according to the invention will be explained in reference to the drawings.

Figure 1:
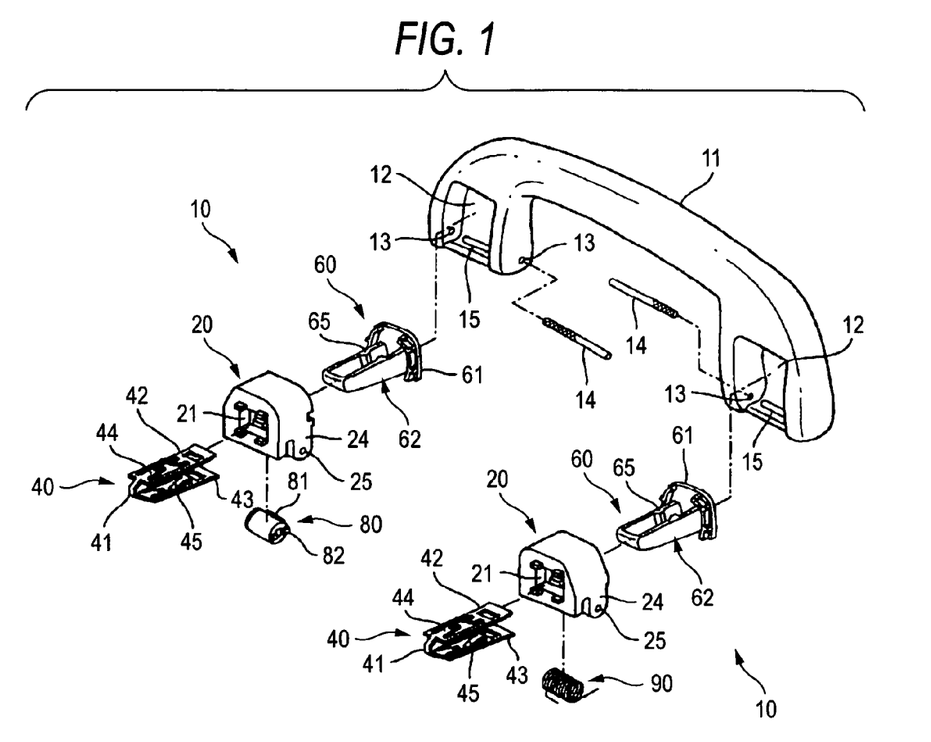
FIG. 1 is a disassembled perspective view showing an embodiment of an apparatus of attaching an interior part of an automobile of the invention.

As shown by FIG. 1, an apparatus 10 of attaching an interior part of an automobile (hereinafter, refer to as attaching apparatus 10) is applied to an apparatus of attaching an assist grip as an automobile interior part. A grip main body 11 of an assist grip is formed with recess portions 12 at both end portions thereof. Both side walls of the recess portions 12 are formed with shaft attaching holes 13, support shafts 14 are inserted into the shaft attaching holes 13 and pivotably connected to the attaching apparatus 10.

The respective recess portions 12 are respectively arranged with the attaching apparatus 10 according to the invention. The attaching apparatus 10 includes a base portion 20, a clip 40 made of a metal a base end portion of which is held by the base portion 20, and a cap 60 attached to the base portion 20 from a surface side thereof.

The attaching apparatus 10 arranged at the recess portion 12 on one side of the grip main body 11 is integrated with an oil damper 80. The oil damper 80 is constituted by a publicly-known multiple cylinder structure and a rib 81 formed along an axial direction of a cylinder on an outer side is engaged with an engaging groove 15 of the recess portion 12 to thereby restrict rotation. A rib 82 is formed at an end face of an inner cylinder of the oil damper 80, and the rib 82 is engaged with the base portion 20 in a mode, mentioned later. Therefore, when the grip main body 11 is pivoted relative to the base portion 20, sliding movement is produced between the outer cylinder and the inner cylinder of the oil damper 80 to exert a brake force by filled oil.

A torsional coil spring 90 is mounted to the attaching apparatus 10 arranged at the recess portion 12 on other side of the grip main body 11. The torsional coil spring 90 urges to pivot the grip main body 11 in a constant direction, that is, a direction of being brought into contact with an inner wall face of the automobile.

Figure 2A:
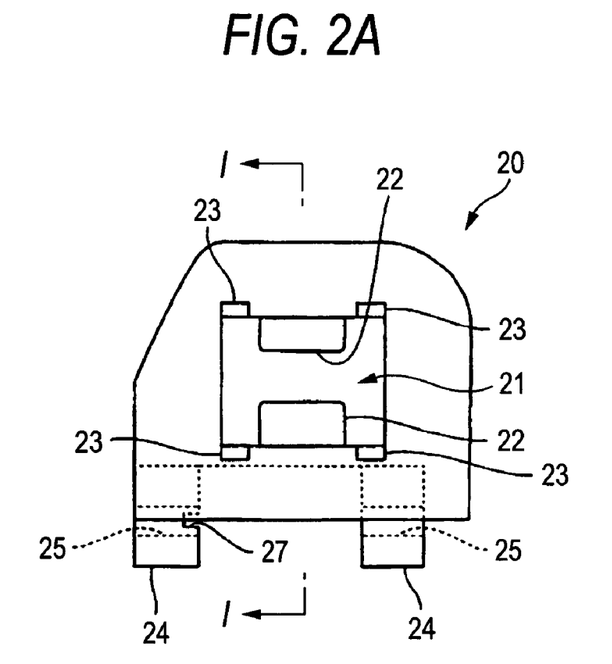
FIG. 2A is a front view and FIG. 2B is a sectional view taken along a line I-I thereof.
Figure 2B:
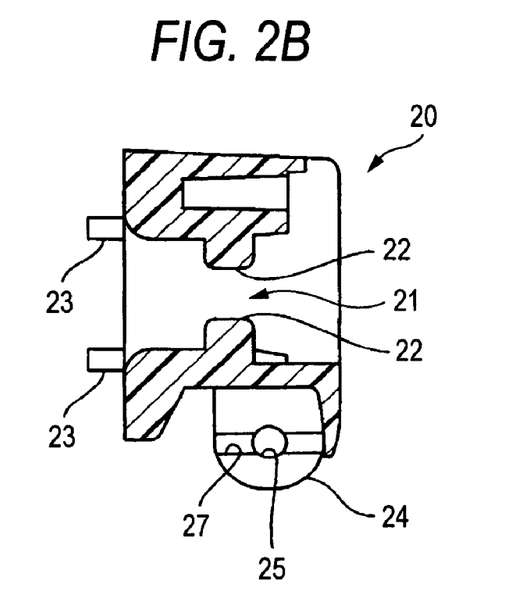

Also in reference to FIGS. 2A and 2B, the base portion 20 is formed with a clip inserting hole 21 at a center thereof for inserting the base end portion of the clip 40. Projected portions 22 are respectively formed at a pair of inner wall faces of the clip inserting hole 21 opposed to each other. Further, a face of the base portion 20 on a side of a vehicle body panel is formed with four projections 23 disposed at four corners of the clip inserting hole 21.

A pair of bearing portions 24 are projected from one side wall of the base portion 20 at a predetermined interval therebetween. The above-described oil damper 80 or torsional coil spring 90 is arranged between the pair of bearing portions 24. Shaft inserting holes 25 are formed at center portions of the pair of bearing portions 24, and the above-described support shafts 14 are inserted thereinto.

An inner side face of the bearing portion 24 on one side is formed with a damper attaching groove 27 linearly in a diameter direction to pass the shaft insetting hole 25. The damper attaching groove 27 is inserted with the rib 82 of the oil damper 80, mentioned above, and the inner cylinder of the oil damper 80 is stopped to rotate at the base portion 20.

Figure 3A:
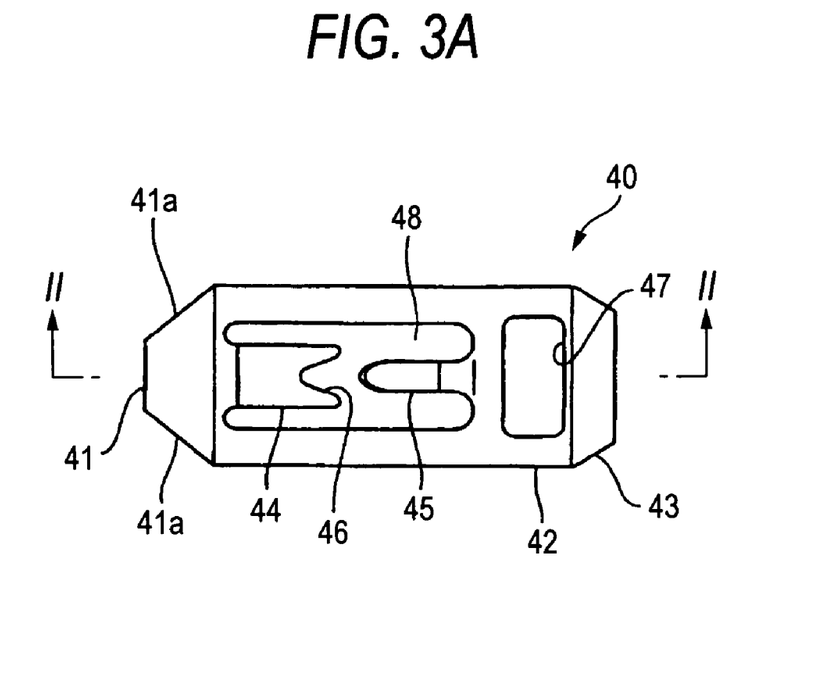
FIG. 3A is a front view and FIG. 3B is a sectional view taken along a line II-II thereof.
Figure 3B:
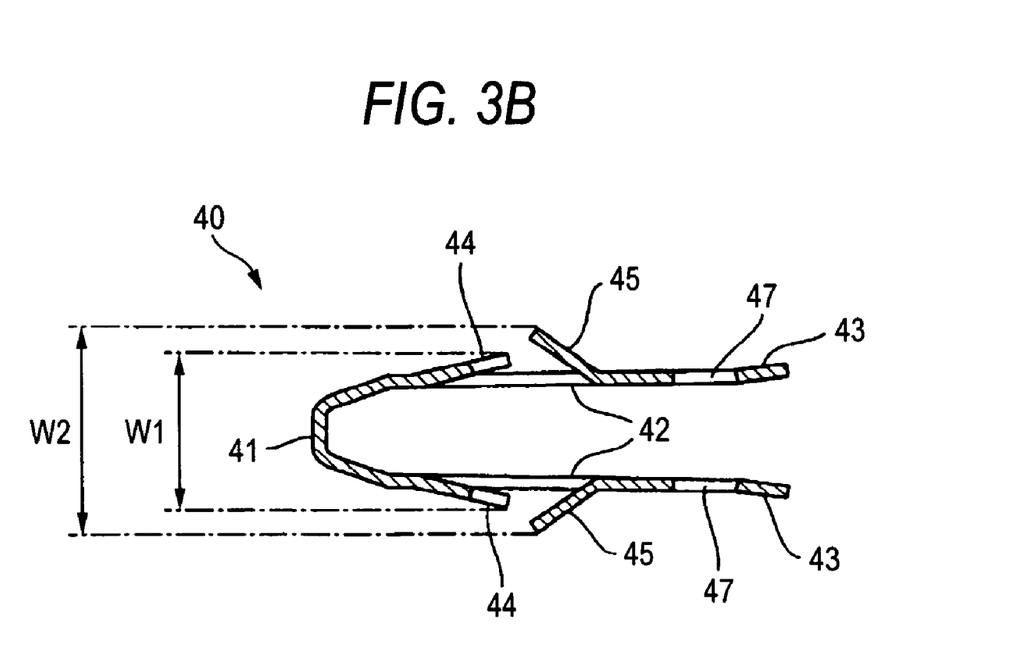
Figure 4:
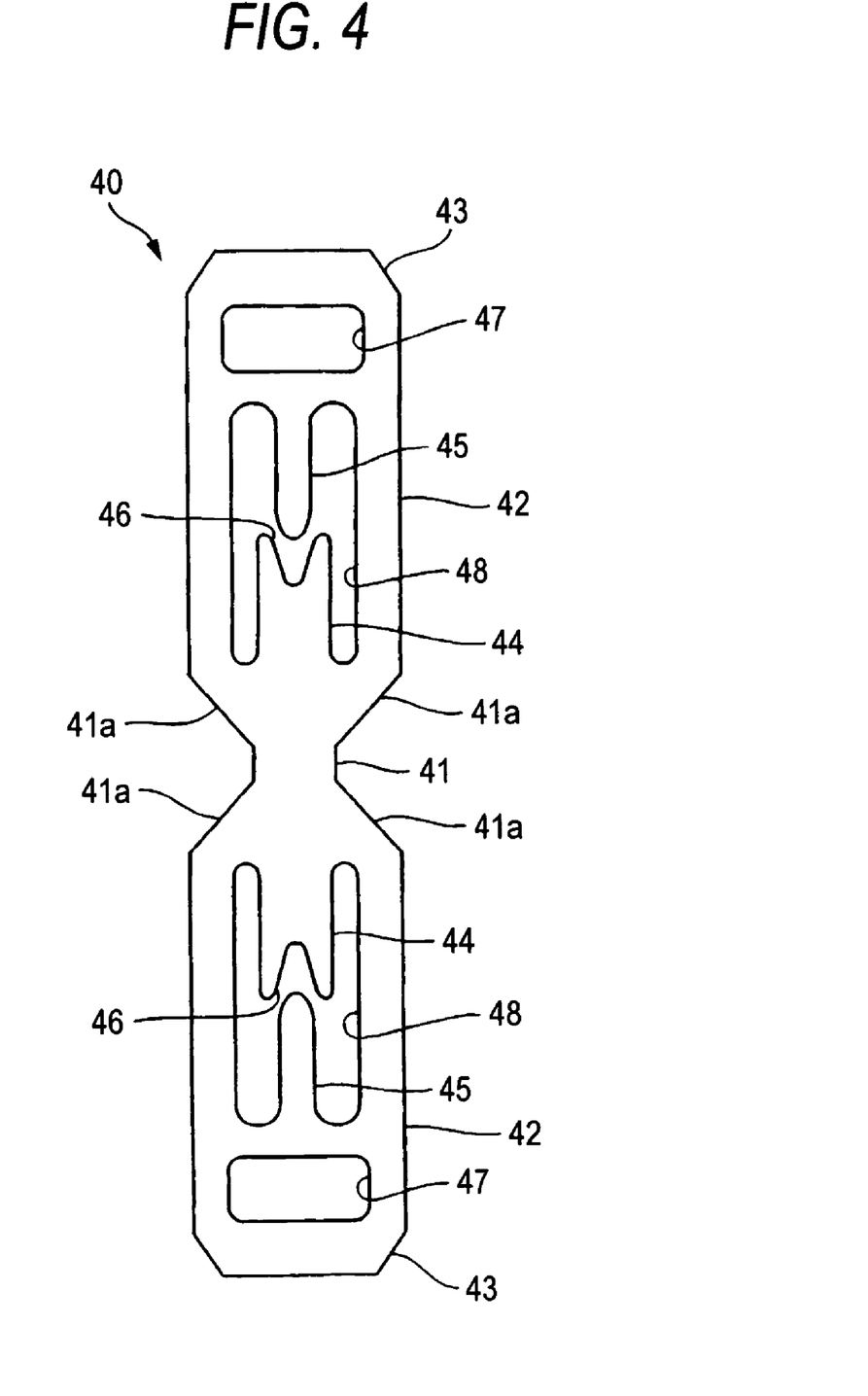
FIG. 4 is a plane view showing a state of developing the clip of the apparatus of attaching an interior part of an automobile.

Next, explaining the clip 40 in reference to FIGS. 3A, 3B and 4, the clip 40 includes a front end portion 41 bent in a U-like shape, a pair of parallel portions 42 extended from the front end portion 41 substantially in parallel with each other, and base end portions 43 of the pair of parallel portions 42. Further, according to the invention, the base end portion of the clip 40 signifies a region also including a base portion side of the parallel portion 42.

The front end portion 41 bent in the U-like shape includes a taper portion 41a gradually narrowed toward a front end in a width thereof. The pair of parallel portions 42 are formed with punched holes 48, and by the punched holes 48, there are formed draw stop claws 44 base portions of which are connected to a side of the front end portion 41, and hold claws 45 base portions of which are connected to sides of the base end portions 43 in cut-to-rise shapes by being opposed to each other at front end portions thereof.

The draw stop claw 44 comprises a plate-like piece having a width either than the hold claw 45, formed with a V-like groove 46 at a center of a front end portion thereof, and a front end thereof constitutes two projections. On the other hand, the hold claw 45 comprises a plate-like piece having a width narrower than the draw stop claw 44 and formed to project to face the V-like groove 46 of the draw stop claw 44 at a front end portion thereof.

FIG. 4 is a plane view showing a state of developing the clip 40. As shown by the drawing, in a developed state, the front end portion of the hold claw 45 is brought into the V-like groove 46 of the draw stop claw 44 to be formed such that a length of the hold claw 45 is made to be as long as possible.

As shown by FIG. 3B, the draw stop claw 44 and the hold claw 45 are folded to be bent respectively to outer sides to constitute a shape in which the front end portions are opposed to each other. Further, an interval W1 between the front end portions of the draw stop claws 44 is formed to be larger than an inner diameter A of an attaching hole 96 of a vehicle body panel 95 shown in FIG. 8. Further, an interval W2 between the front end portions of the hold claws 45 is formed to be larger than the interval W1 between the front end portions of the draw stop claws 44.

Figure 9:
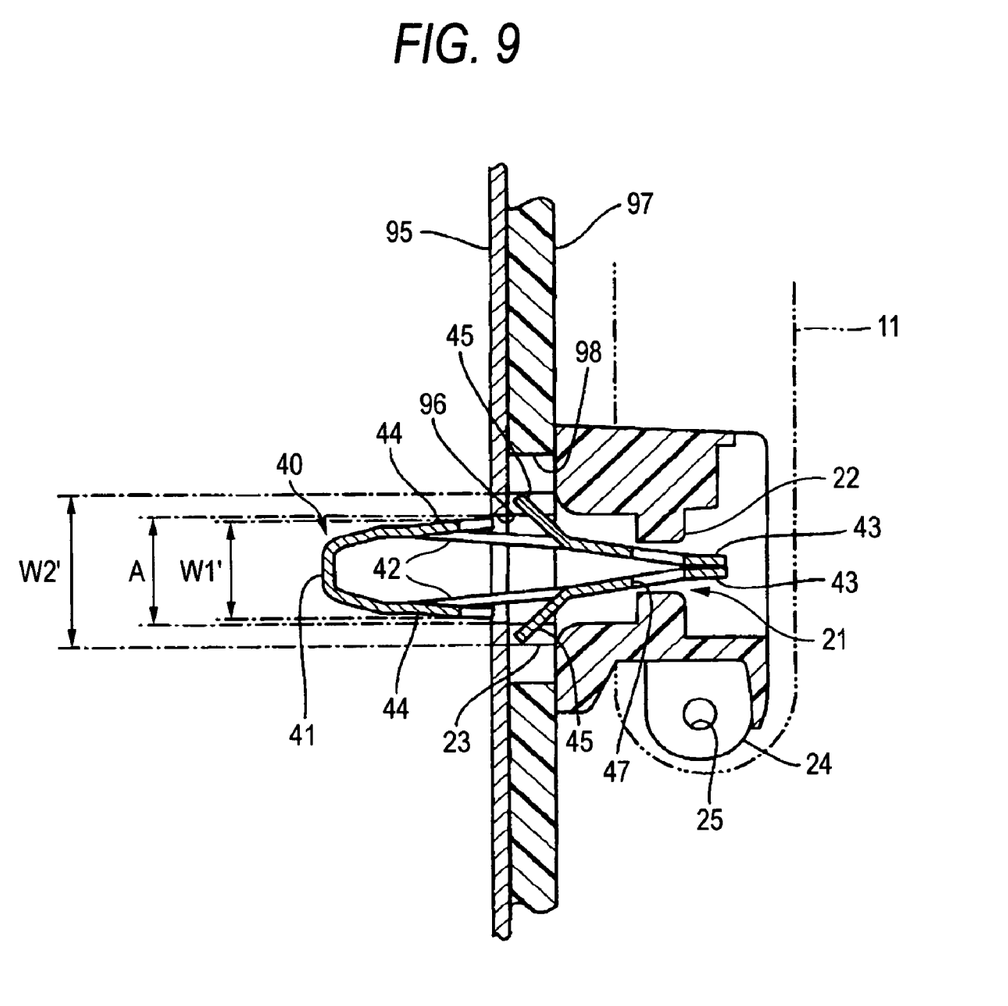
FIG. 9 is a sectional view when the apparatus of attaching an interior part of an automobile is detached from the interior panel and the vehicle body panel.

Further, as shown by FIG. 9, when the pair of parallel portions 42 are maximally closed by pinching the base end portions 43 of the clip 40 by the finger or a plier, the clip 40 is formed such that an interval W1' between the front end portions of the draw stop claws 44 becomes smaller than the inner diameter A of the attaching hole 96 and an interval W2' between the front end portions of the hold claws 45 becomes larger than the inner diameter A of the attaching hole 96.

Engaging holes 47 are respectively formed on sides of the base end portions 43 further from the punched holes 48 of the pair of parallel portions 42 of the clip 40. A shape of an inner periphery of the engaging hole 47 is constituted by a shape capable of fitting the projected portion 22 of the base portion 20, mentioned above. The base end portions 43 constitute a shape opened slightly to outer sides to facilitate to insert the cap 60, mentioned later.

Figure 5A:
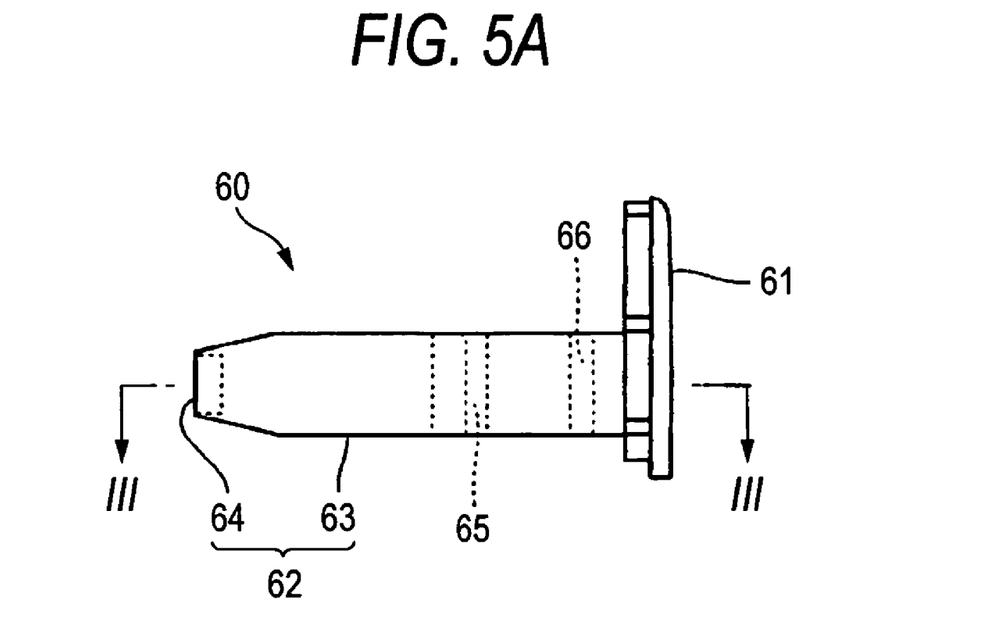
FIG. 5A is a front view and FIG. 5B is a sectional view taken along a line III-III thereof.
Figure 5B:
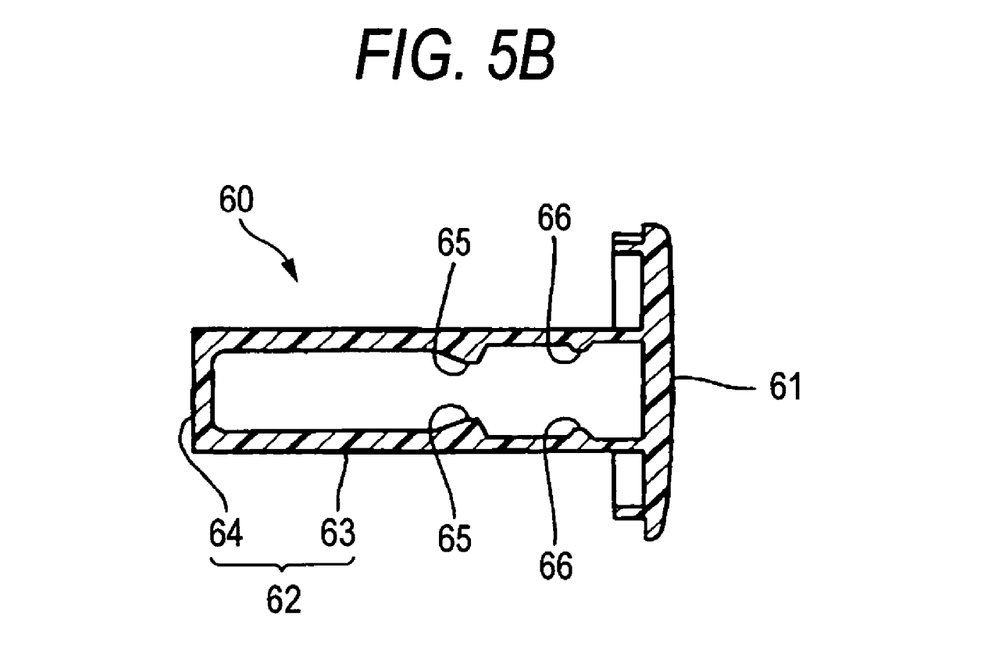

As shown by FIGS. 5A and 5B, the cap 60 includes a head portion 61 to be fitted to a surface side of the base portion 20. Further, a pair of parallel plate-like portions 63 are extended from a back face side of the head portion 61 to be substantially orthogonal thereto. Front end portions of the pair of plate-like portions 63 are gradually narrowed in a width thereof, and front ends thereof are connected by a connecting portion 64. A leg portion 62 is formed by the pair of plate-like portions 63 and the connecting portion 64.

The leg portion 62 serves to restrict the parallel portions 42 of the clip 40 from being closed by bringing both sides of the plate-like portions 63 into contact with inner side faces of the parallel portions 42 opposed to each other when the leg portion 62 is inserted between the pair of parallel portions 42 of the clip 40, mentioned above. Further, the inner side faces of the pair of plate-like portions 63 are formed with engaging claws 65 to be engaged with the projected portions 22 of the base portion 20, mentioned above.

That is, when the leg portion 62 is inserted between the pair of parallel portions 42 of the clip 40 by passing the clip inserting hole 21 of the base portion 20, the engaging claws 65 are engaged with the projected portions 22 of the base portion 20 to stop to be drawn.

Further, when the engaging claws 65 are engaged with the projected portions 22, hold ribs 66 formed on the inner side faces of the plate-like portions 63 are brought into contact with corner portions on a surface side of the projected portions 22. That is, the engaging claws 65 and the hold ribs 66 are engaged with the corner portions of the projected portions 22 opposed to each other to hold the cap 60 without play.

Next, an explanation will be given of a method of using the attaching apparatus 10 according to the invention in reference to FIGS. 6 through 9.

Figure 6:
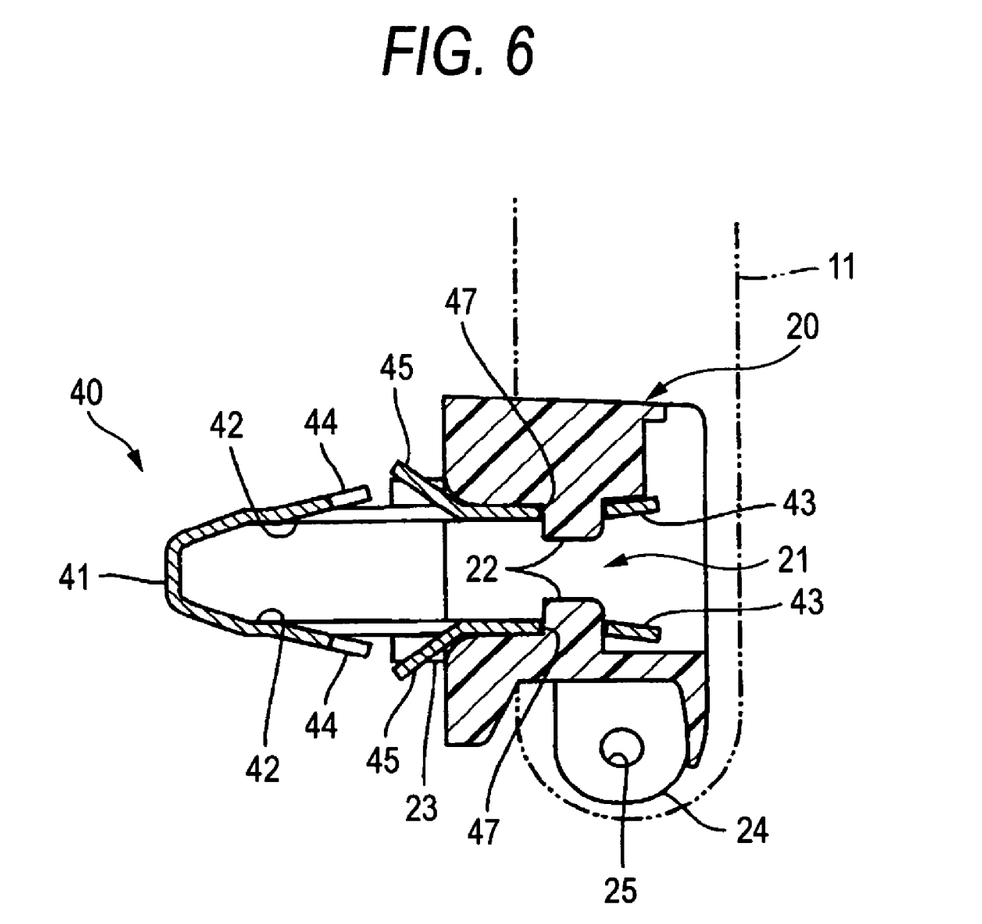
FIG. 6 is a sectional view showing a state before attaching the apparatus of attaching an interior part of an automobile to an interior panel and a vehicle body panel.

First, as shown by FIG. 6, the base end portions 43 are inserted into the clip inserting hole 21 from the back face side of the base portion 20 while contracting the diameter by pressing the pair of parallel portions 42 of the clip 40 by the fingers. At this occasion, the engaging holes 47 of the pair of parallel portions 42 are positioned to match the projected portions 22 of the base portion 20, the engaging holes 47 are engaged with the projected portions 22, thereby, the clip 40 is held by the base portion 20. Further, the grip main body 11 is connected to the base portions 20 via the support shafts 14 by the above-described mode.

Figure 7:
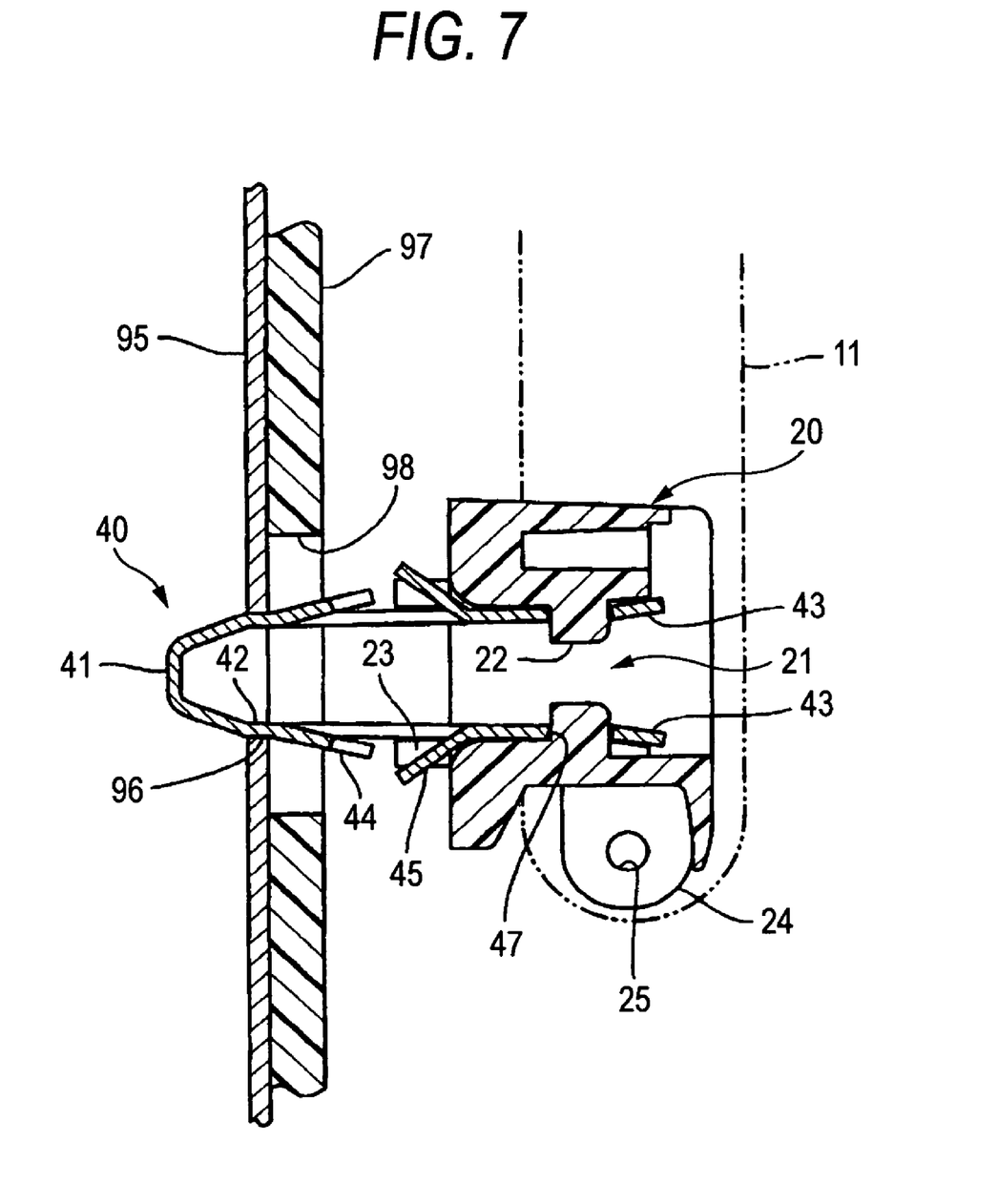
FIG. 7 is a sectional showing a state of attaching the apparatus of attaching an interior part of an automobile to the interior panel.

Under the state, as shown by FIG. 7, the front end portion 41 of the clip 40 is inserted into an opening portion 98 of an interior panel 97 and the attaching hole 96 of the vehicle body panel 95 and the clip 40 is pressed to the attaching hole 96.

Figure 8:
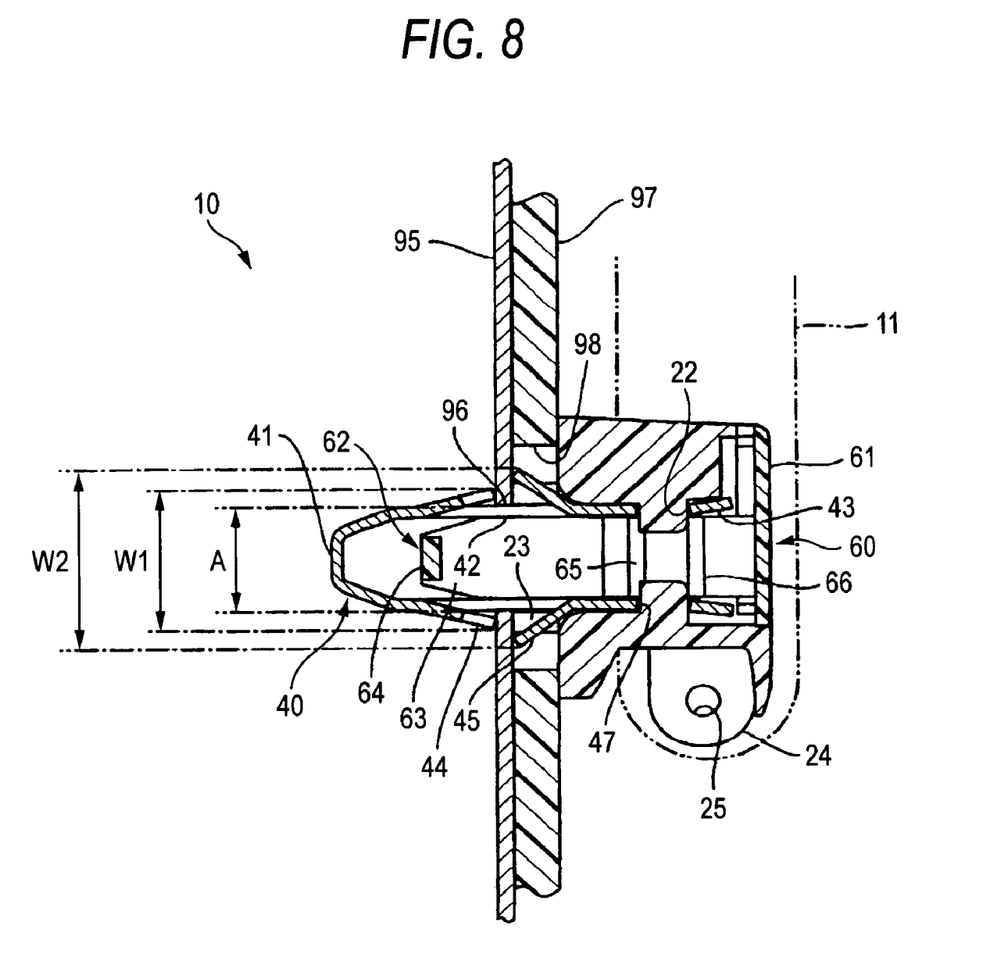
FIG. 8 is a sectional showing a state of attaching apparatus of attaching an interior part of an automobile to the vehicle body panel.

Then, the draw stop claws 44 are bent to inner sides, pass the attaching hole 96 and are engaged with a peripheral edge on a back face side of the attaching hole 96 as shown by FIG. 8. At this occasion, the hold claws 45 are engaged with a peripheral edge on a surface side of the attaching hole 96. Therefore, the clip 40 is fixed to the vehicle body panel 95 without play.

At this occasion, the inner panel 97 is pinched between the vehicle body panel 95 and the back face of the base portion 20 to be brought into close contact with the surface of the vehicle body panel 95. Further, the projections 23 formed at the four corners of the clip inserting hole 21 of the base portion 20 are brought into contact with a peripheral edge of the attaching hole 96 of the vehicle body panel 95.

Under the state, the leg portion 62 of the cap 60 is made to pass the clip inserting hole 21 of the base portion 20 to be inserted between the pair of parallel portions 42 of the clip 40. As a result, the two side faces of the pair of plate-like portions 63 constituting the leg portion 62 are brought into contact with the inner faces of the pair of parallel portions 42 of the clip 40, thereby, the parallel portions 42 of the clip 40 are restricted from being bent to the inner sides and engagement to the attaching hole 96 of the vehicle body panel 95 is ensured.

When the leg portion 62 is pressed until the head portion 61 of the cap 60 is brought into contact with the surface side of the base portion 20, the engaging claws 65 formed at the inner side faces of the pair of the plate-like portions 63 are engaged with the corner portions of the projected portions 22 of the base portion 20, and the cap 60 is fixed to stop to be drawn from the base portion 20.

At this occasion, the hold ribs 66 formed at the side faces of the plate-like portions 63 are brought into contact with the corner portions on the surface side of the projected portions 22 of the base portion 20 and therefore, the cap 60 is firmly fixed to the base portion 20 without play. In this way, by the attaching apparatus 10, the grip main body 11 of the assist grip can solidly be fixed to the attaching hole 96 of the vehicle body panel 95.

Next, an explanation will be given of a detaching method when the attaching apparatus 10 needs to be detached from the vehicle body panel 95 by some reason.

That is, as shown by FIG. 9, first, the cap 60 is plied to be opened to be drawn by a tool of a minus driver or the like, the base end portion 43 of the grip 40 is pinched by the finger or a plier by passing the clip inserting hole 21 of the base portion 20 to bring the pair of parallel portions 42 in a maximally closed state.

Then, the interval W1' between the front end portions of the draw stop claws 44 become smaller than the inner diameter A of the attaching hole 96 and therefore, the attaching apparatus 10 can be detached from the vehicle body panel 95 by drawing the clip 40 from the attaching hole 96.

Further, in the state of maximally closing the pair of parallel portions 42, the interval W2' between the front end portions of the hold claw 45 is formed to be wider than the inner diameter A of the attaching hole 96 and therefore, a trouble that the clip 40 is dropped to the back face side of the attaching hole 96 under the state can firmly be prevented. In this way, the attaching apparatus 10 can be detached from the vehicle body panel 95 easily by feeling at ease.

Further, according to the embodiment, the front end portions of the pair of plate-like portions 63 forming the leg portion 62 of the cap 60 are connected by the connecting portion 64 and therefore, a trouble that the front end portions of the pair of plate-like portions 63 are unpreparedly opened to be caught by the attaching hole 96 of the vehicle body panel 95 when the leg portion 62 of the cap 60 is pressed into the clip 40 can be prevented.

Figure 10:
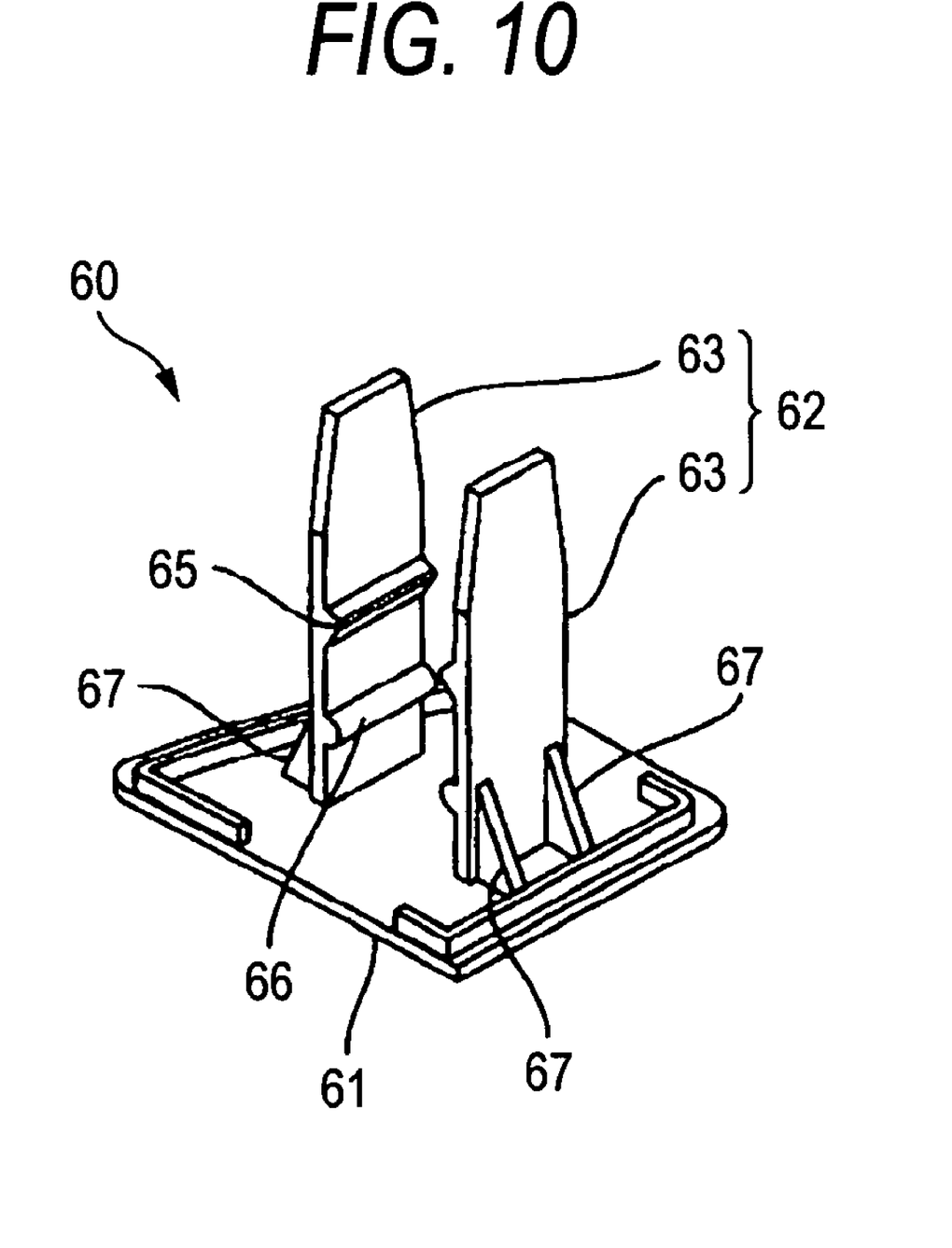
FIG. 10 is a perspective view showing other shape of a leg portion of the cap constituting the apparatus of attaching an interior part of an automobile.

However, according to the invention, as shown by FIG. 10, the leg portions 62 can be formed by a shape of being projected in parallel with each other independently without connecting the front end portions of the pair of plate-like portions 63 constituting the leg portion 62. In this case, it is preferable to provide a pair of ribs 67 or the like respectively on base portion sides of outer side faces of the respective plate-like portions 63 to prevent the plate-like portions 63 from being bent to outer sides.

Further, the inner side faces of the respective plate-like portions 63 are formed with the engaging claws 65 and the hold ribs 66 as described above. According to the cap 60, the pair of plate-like portions 63 are facilitated to be bent to outer sides and therefore, the engaging claws 65 can be facilitated to be engaged with each other by riding over the corner portions of the projected portion 22 of the base portion 20.

Further, the clip inserting hole 21 according to the above-described embodiment constitutes an opening portion of the invention.

The invention can be utilized as the attaching apparatus preferable for attaching an interior part of an assist grip, a sun visor, a room lump or the like of an automobile to a vehicle body panel.

What is claimed is:

1. An apparatus of attaching an interior part of an automobile, comprising:
    a base portion connected to an interior part of an automobile;
    a clip that a base end portion of which is held by the base portion and a front end portion of which is inserted to be locked by a vehicle body panel attaching hole; and
    a cap having a leg portion inserted to an inner side of the clip for ensuring a state of locking the clip;
    wherein the base portion includes an opening portion inserted with the base end portion of the clip and projected portions formed at inner walls of the opening portion opposed to each other;
    wherein the clip includes the front end portion bent in a U-shape, parallel portions extended from the front end portion substantially in parallel with each other, the base end portion inserted into the opening portion of the base portion, a draw stop claw provided at each parallel portion and engaged with a peripheral edge on a back face side of the vehicle body panel attaching hole, a hold claw provided on a base end portion side of the clip and engaged with a peripheral edge on a surface side of the vehicle body panel attaching hole, and the parallel portions each including an engaging hole therethrough and engaged with the projected portions of the base portion; and
    wherein in a state of maximally closing each parallel portions of the clip, the clip having an interval between front ends of the draw stop claws which is smaller than an inner diameter of the vehicle body panel attaching hole.

2. The apparatus of attaching an interior part of an automobile according to claim 1, wherein the clip is formed such that a width of the draw stop claw is wider than a width of the hold claw, a center of a front end of the draw stop claw is provided with a notch in a V-shape, the width of the hold claw is narrower than the width of the draw stop claw, in a state of developing a plate member constituting the clip, a front end of the hold claw is brought into the notch in the V-shape of the draw stop claw.

3. The apparatus of attaching an interior part of an automobile according to claim 1, wherein the cap includes a head portion fitted on the base portion, and a leg portion comprising a pair of plate-like portions extended from a back face of the head portion substantially in parallel with each other, both sides of the plate-like portions are brought into contact with inner sides of the parallel portions of the clip, and inner faces of the plate-like portions are formed with engaging claws engaged with the projected portions of the base portion.

4. The apparatus of attaching an interior part of an automobile according to claim 3,
wherein front ends of the pair of plate-like portions constituting the leg portion of the cap are connected to each other.

5. The apparatus of attaching an interior part of an automobile according to claim 3,
wherein front ends of the pair of plate-like portions constituting the leg portion of the cap are separated from each other.

* * * * *